United States Patent Office 3,238,234
Patented Mar. 1, 1966

3,238,234
HEMI-ESTERS AND PHOSPHATES OF 19-NOR-PREGNAN-21-OL-3,20-DIONE AND METALLIC SALTS THEREOF
Albert Bowers, Mexico City, Mexico, assignor to Syntex Corporation, Panama, Panama, a corporation of Panama
No Drawing. Filed Dec. 23, 1963, Ser. No. 332,962
Claims priority, application Mexico, Apr. 9, 1963, 71,623
13 Claims. (Cl. 260—397.47)

The present invention relates to certain novel cyclopentanophenanthrene derivatives and to a method for the preparation thereof.

More particularly the present invention relates to hemi-esters of 19-nor-pregnan-21-ol-3,20-dione derived from hydrocarbon dicarboxylic acids and to novel phosphates of 19-nor-pregnan-21-ol-3,20-dione, as well as their metallic salts.

The novel compounds of the present invention may be represented by the following formulas:

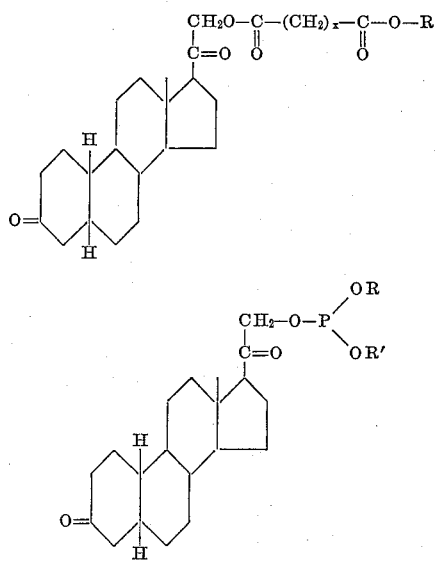

In the preceding formulas X represents an integer from 1 to 8 inclusive, preferably from 1 to 6, inclusive; R and $R^1$ represent hydrogen or an alkali metal and when both R and $R^1$ represents an alkali metal, R and $R^1$ are the same.

The novel compounds of the present invention represented by the preceding formulas are soluble in water, thus facilitating their administration. They may be used as anesthetic agents, anti-convulsants and sedatives of high activity. In addition, they have hypnotic and muscle relaxant activities and may be widely used as basal anesthetics by the intravenous route in sterile aqueous solutions. Other routes of administration are the oral, subcutaneous and intramuscular, without irritating the place of the injection and with very low toxicity.

The novel compounds of the present invention may be prepared by the process illustrated as follows:

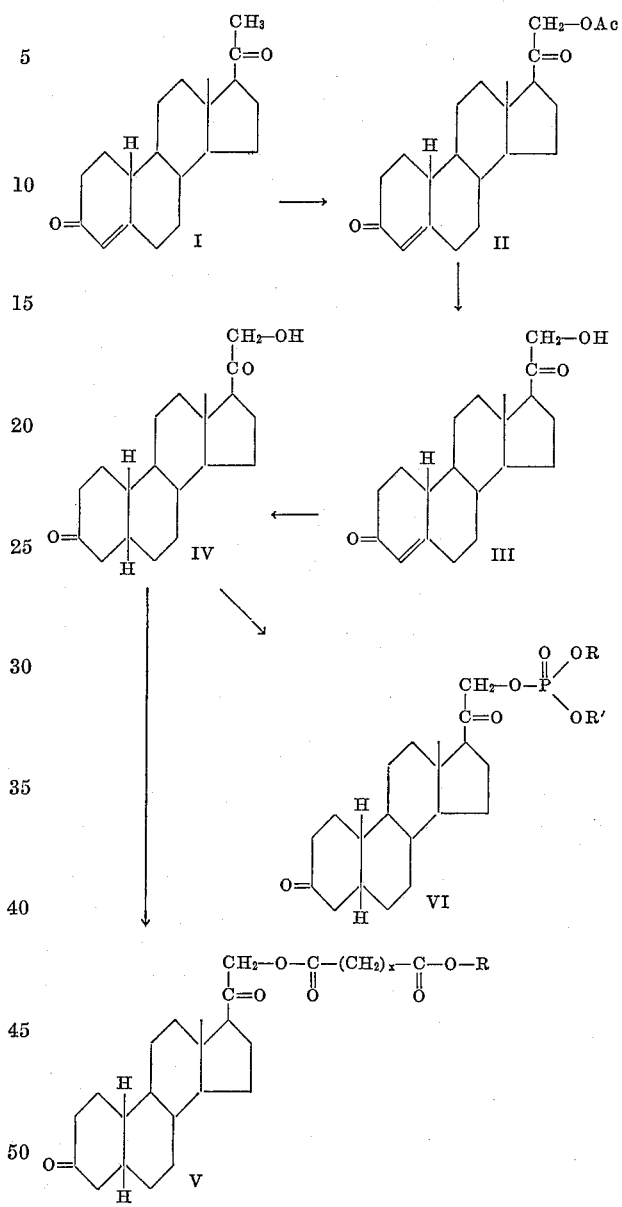

In the preceding formulas X, R and $R^1$ have the same meaning as heretofore set forth.

In accordance with the preceding scheme, 19-nor-progesterone (I) is treated with calcium oxide, preferably with 1½ times its weight, in an organic polar solution, such as for example in a mixture of tetrahydrofuran-methanol, and with iodine, preferably 1½ times its weight, thus producing 21-iodo-19-nor-progesterone, which by boiling with potassium acetate in an organic polar solution, preferably in acetone solution for approximately 8 hours, produces 21-acetoxy-19-nor-progesterone (II), which in turn, upon conventional saponification with potassium hydroxide, produces the corresponding free compound (III).

This compound is hydrogenated in the presence of a base, such as for example potassium hydroxide, and using a suitable catalyst, preferably 5% palladium on charcoal, thus giving 19-nor-pregnan-21-ol-3,20-dione (IV). By treatment of this compound with an anhydride derived from a hydrocarbon dicarboxylic acid of less than 11 carbon atoms, such as for example malonic, glutaric, adipic, pimelic and suberic anhydrides, and the like, in a tertiary amine, preferably in pyridine, at room temperature and for a period of time in the order of 24 hours, there are obtained the corresponding 21-hemi-esters (V; R=H), which upon treatment with an alkali metal basic salt, preferably the bicarbonate of the metal, such as for example sodium bicarbonate, potassium bicarbonate, etc., for a period of time of approximately 30 minutes, produce the corresponding alkali salts of the 21-hemi-esters (V; R=alkali metal).

19-nor-pregnan-21-ol-3,20-dione (IV) is treated with methane sulfonyl chloride in the presence of pyridine at approximately 0° C. for about 14 hours to produce the corresponding 21-methane-sulfonate, which upon treatment with sodium iodide, preferably in acetone solution, produces 21-iodo-19-nor-pregnan-3,20 - dione, which in turn, by treatment with monobasic silver phosphate in a suitable solvent such as acetonitrile, preferably under reflux for a period of time of approximately 2 hours, produces the 21-phosphate of 19-nor-pregnan-21-ol-3,20-dione (VI; R=R$^1$=H). To a solution of the preceding phosphate, preferably in methanol, there is added dropwise a dilute solution of an alkali metal hydroxide, such as for example sodium or potassium hydroxide, until the pH reaches 4.8–5, thus giving the 21-mono alkali metal phosphate of 19-nor-pregnan-21-ol-3,20-dione (VI; R=H, R$^1$=alkali metal). The 21-di-alkali metal phosphate of 19-nor-pregnan-21 - ol - 3,20 - dione (VI; R=R$^1$=alkali metal) is obtained when sufficient solution of alkali metal hydroxide is added to attain a pH of 9.5 to 10.

The following specific examples serve to illustrate but are not intended to limit the scope of the present invention.

*Example I*

A cooled solution of 4 g. of 19-nor-progesterone in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-19-nor-progesterone. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 21-acetoxy-19-nor-progesterone.

*Example II*

A solution of 1 g. of 21-acetoxy-19-nor-progesterone in 50 cc. of methanol was stirred under nitrogen atmosphere at 0° C. and for 1 hour, with 200 mg. of potassium hydroxide dissolved in 1 cc. of water; it was then poured into ice water, the formed precipitate filtered off, washed with water to neutral and dried, thus producing a crude compound which upon crystallization from methylene chloride-ether afforded 21-hydroxy-19-nor-progesterone.

*Example III*

To a solution of 6 g. of 21-hydroxy-19-nor-progesterone, in 120 cc. of dioxane there were added 120 mg. of potassium hydroxide in 3 cc. of methanol and 1.2 g. of 5% palladium on charcoal catalyst and the mixture was hydrogenated at atmospheric pressure for 3 hours. After this time, the resulting mixture was filtered and the filtrate diluted with water, thus giving a precipitate which was isolated, dried and recrystallized from acetone-hexane to produce 19-nor-pregnan-21-ol-3,20-dione.

*Example IV*

A solution of 5 g. of the last mentioned compound and 5 g. of recrystallized succinic anhydride in 100 cc. of anhydrous pyridine was maintained at room temperature for 24 hours; it was then cooled in an ice bath and poured little by little on 1 liter of ice water. The excess of pyridine was neutralized with 3 N hydrochloric acid and the solution was diluted with 2 more liters of ice water. The formed precipitate was collected by filtration, washed with water and dried. Crystallization from aqueous methanol gave the 21-hemisuccinate of 19-nor-pregnan-21-ol-3,20-dione.

*Example V*

To a dried mixture of 5 g. of the latter hemisuccinate and 1 g. of sodium bicarbonate there were added in small portions 100 cc. of water with slight heating, over a period of 30 minutes. The colorless solution was filtered through a Seitz filter after adding "supercel," and the filtrate was lyophilized under high vacuum to produce the sodium salt of the hemisuccinate of 19-nor-pregnan-21-ol-3,20-dione.

*Example VI*

A solution of 3.4 g. of 19-nor-pregnan-21-ol-3,20-dione in 20 cc. of a mixture of chloroform/pyridine (9:1) was cooled to 0° C. and mixed with 1.4 g. of methanesulfonyl chloride which was added in small portions. The reaction mixture was maintained at 0° C. for 14 hours and then washed with dilute hydrochloric acid, water, sodium bicarbonate solution, and the chloroform was evaporated under vacuo. The residue formed by the crude 21-methanesulfonate was dissolved in 20 cc. of acetone and treated at room temperature and under stirring with 4 g. of sodium iodide. After decolorization of the mixture by addition of sodium thiosulfate solution, the product was precipitated by the addition of water and the precipitate was filtered and recrystallized from acetone - hexane to produce 21 - iodo-19-nor-pregnan-3,20-dione.

*Example VII*

A mixture of 1 g. of 21-iodo-19-nor-pregnan-3,20-dione, 1.1 molar equivalents of silver monobasic phosphate and 60 cc. of acetonitrile was boiled under reflux for 2 hours. The mixture was filtered and the filtrate evaporated to dryness, thus giving a residue which was crystallized from methanol-ethyl acetate to produce the 21-monobasic phosphate of 19-nor-pregnan-21-ol-3,20-dione.

*Example VIII*

To a solution of 2.5 g. of the foregoing phosphate in 25 cc. of methanol there was added dropwise a 2 N aqueous sodium hydroxide solution until the pH of the solution (potentiometrically controlled) reached 4.8–5.0. There were then slowly added 60 cc. of ether, thus precipitating the 21-monosodium phosphate of 19-nor-pregnan-21-ol-3,20-dione.

*Example IX*

To a solution of 2.5 g. of the monobasic phosphate of 19-nor-pregnan-21-ol-3,20-dione in 25 cc. of methanol there was added dropwise a 2 N aqueous solution of sodium hydroxide until the pH of the solution reached 9.5–10; ether was then added until complete precipitation, the solid was collected by filtration, washed with ether and dried, thus giving the 21-disodium phosphate of 19-nor-pregnan-21-ol-3,20-dione.

*Example X*

Example IV was repeated but the succinic anhydride was substituted by malonic, glutaric, adipic, pimelic and suberic anhydrides, thus giving respectively the hemimalonate, hemiglutarate, hemiadipate, hemipimelate and hemisuberate of 19-nor-pregnan-21-ol-3,20-dione.

*Example XI*

The hemiesters obtained in accordance with Example X were treated in accordance with the method described in Example V, thus giving respectively the sodium salt of the hemimalonate, of the hemiglutarate, of the hemiadipate, of the hemipimelate and of the hemisuberate of 19-nor-pregnan-21-ol-3,20-dione.

*Example XII*

The method described in Example III was repeated except that sodium bicarbonate was substituted by potassium bicarbonate, thus affording the potassium salt of the hemisuccinate of 19-nor-pregnan-21-ol-3,20-dione.

By the same method there were obtained the potassium salts of the 21-hemiesters mentioned in Example X.

*Example XIII*

The method described in Example VIII was repeated but potassium hydroxide was used instead of sodium hydroxide, thus producing the 21-monopotassium phosphate of 19-nor-pregnan-21-ol-3,20-dione.

*Example XIV*

The process described in Example IX was repeated but potassium hydroxide was used instead of sodium hydroxide, thus giving the 21-dipotassium phosphate of 19-nor-pregnan-21-ol-3,20-dione.

I claim:
1. A compound of the following formula:

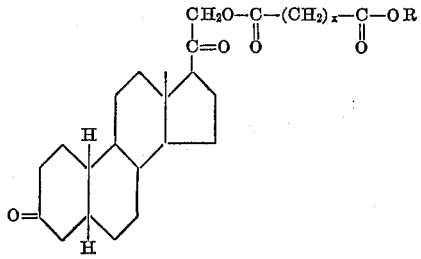

wherein X is an integer of from 3 to 8, inclusive, and R is selected from the group consisting of hydrogen and an alkali metal.

2. The hemiglutarate of 19-nor-pregnan-21-ol-3,20-dione.
3. The hemiadipate of 19-nor-pregnan-21-ol-3,20-dione.
4. The hemipimelate of 19-nor-pregnan-21-ol-3,20-dione.
5. The hemisuberate of 19-nor-pregnan-21-ol-3,20-dione.
6. The hemimalonate of 19-nor-pregnan-21-ol-3,20-dione.
7. The sodium salt of the hemiglutarate of 19-nor-pregnan-21-ol-3,20-dione.
8. The sodium salt of the hemiadipate of 19-nor-pregnan-21-ol-3,20-dione.
9. The sodium salt of the hemipimelate of 19-nor-pregnan-21-ol-3,20-dione.
10. The sodium salt of the hemisuberate of 19-nor-pregnan-21-ol-3,20-dione.
11. The sodium salt of the hemimalonate of 19-nor-pregnan-21-ol-3,20-dione.
12. The 21-monopotassium phosphate of 19-nor-pregnan-21-ol-3,20-dione.
13. The 21-dipotassium phosphate of 19-nor-pregnan-21-ol-3,20-dione.

References Cited by the Examiner

UNITED STATES PATENTS 2,936,313   5/1960   Elks et al. _____ 260—397.45
2,950,298   8/1960   Elks et al. _____ 260—397.45

OTHER REFERENCES

Irmscher: Chemistry and Industry, July 8, 1961, No. 27, page 1035.

Tamm et al.: Steroids, vol. 2, September 1963, pages 271–277.

LEWIS GOTTS, *Primary Examiner.*

JULIAN S. LEVITT, *Examiner.*